(12) United States Patent
Feng

(10) Patent No.: US 7,172,278 B2
(45) Date of Patent: Feb. 6, 2007

(54) NEAR-SIGHTED LENS OF WIDE-VISION DIVING MIRROR

(76) Inventor: Li-Jen Feng, No. 22-10, Lane 50, Tian Muu E. Rd., Taipei (TW)

( * ) Notice: Subject to any disclaimer, the term of this patent is extended or adjusted under 35 U.S.C. 154(b) by 0 days.

(21) Appl. No.: 11/095,641

(22) Filed: Mar. 30, 2005

(65) Prior Publication Data

US 2006/0227284 A1    Oct. 12, 2006

(51) Int. Cl.
*G02C 1/00* (2006.01)

(52) U.S. Cl. .............................. 351/43; 2/430

(58) Field of Classification Search .................. 351/41, 351/43, 158, 159; 2/441, 442, 445, 446, 2/447, 14, 428, 430
See application file for complete search history.

(56) References Cited

U.S. PATENT DOCUMENTS 5,523,804 A * 6/1996 Nolan .......................... 351/43

* cited by examiner

*Primary Examiner*—Hung Xuan Dang
(74) *Attorney, Agent, or Firm*—Pro-Techtor Int'l Services

(57) ABSTRACT

The present invention is a near-sighted lens of a wide-vision diving mirror, wherein contracted latching pieces at the upper, lower, and inner sides of a front lens of a wide-vision diving mirror are latched into the latching slots of lens frames of a mask; two assembling sections are formed by cutting the other side of the front lens, and one side of the side lens, respectively. As there is no frame edge interfering with the vision in combing the front and side lens into a mirror via their assembling sections, a wide-vision and replaceable near-sighted diving mirror can be formed.

3 Claims, 3 Drawing Sheets

NEAR-SIGHTED LENS OF WIDE-VISION DIVING MIRROR

BACKGROUND OF THE INVENTION a) Field of the Invention

The present invention relates to a near-sighted lens of a wide-vision diving mirror, and more particularly to replaceable front and side lenses per prescription of near-sighting. In addition to latching pieces at the upper, lower, and inner sides of the front lens, an assembling section is formed by cutting the other side of the front lens. When combing this assembling section with another assembling section, which is also formed by cutting one side of the side lens, into a wide-vision near-sighted diving mirror, the wide vision of the mirror will not be affected.

b) Description of the Prior Art

A three-window or four-window diving mask in the current market is practically limited due to the frame edge located between the front and the left, or right, side window, thereby affecting the vision. Accordingly, vendors have created a kind of wide-vision diving mask, wherein the front and side lenses of the mask are glued together, to form a front- and side-vision mirror without a vertical frame between the front and side windows. However, the assembly by which the front and side lenses are glued together, is not applicable to allowing the use of near-sighted lenses per prescription for the correction of near-sightness.

SUMMARY OF THE INVENTION

The primary object of the present invention is to form a wide-vision diving mirror, wherein latching pieces formed at the upper, lower, and inner sides of a front lens with different thickness per prescription, are latched into latching slots formed by edges of lens frames of a mask; an assembling section formed by cutting the other side of the front lens is combined with another assembling section also formed by cutting one side of the side lens, to form a wide-vision diving mirror.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
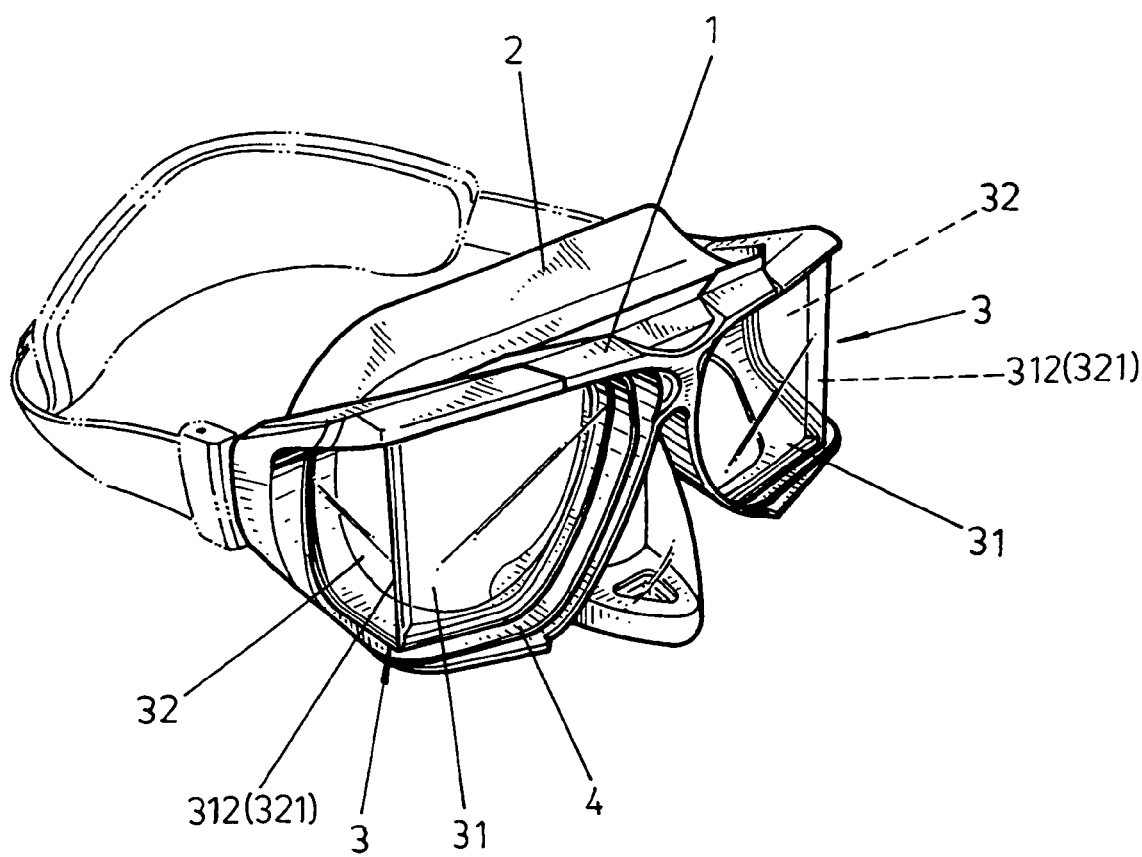
FIG. 1 shows a schematic view of the present invention.
Figure 2:
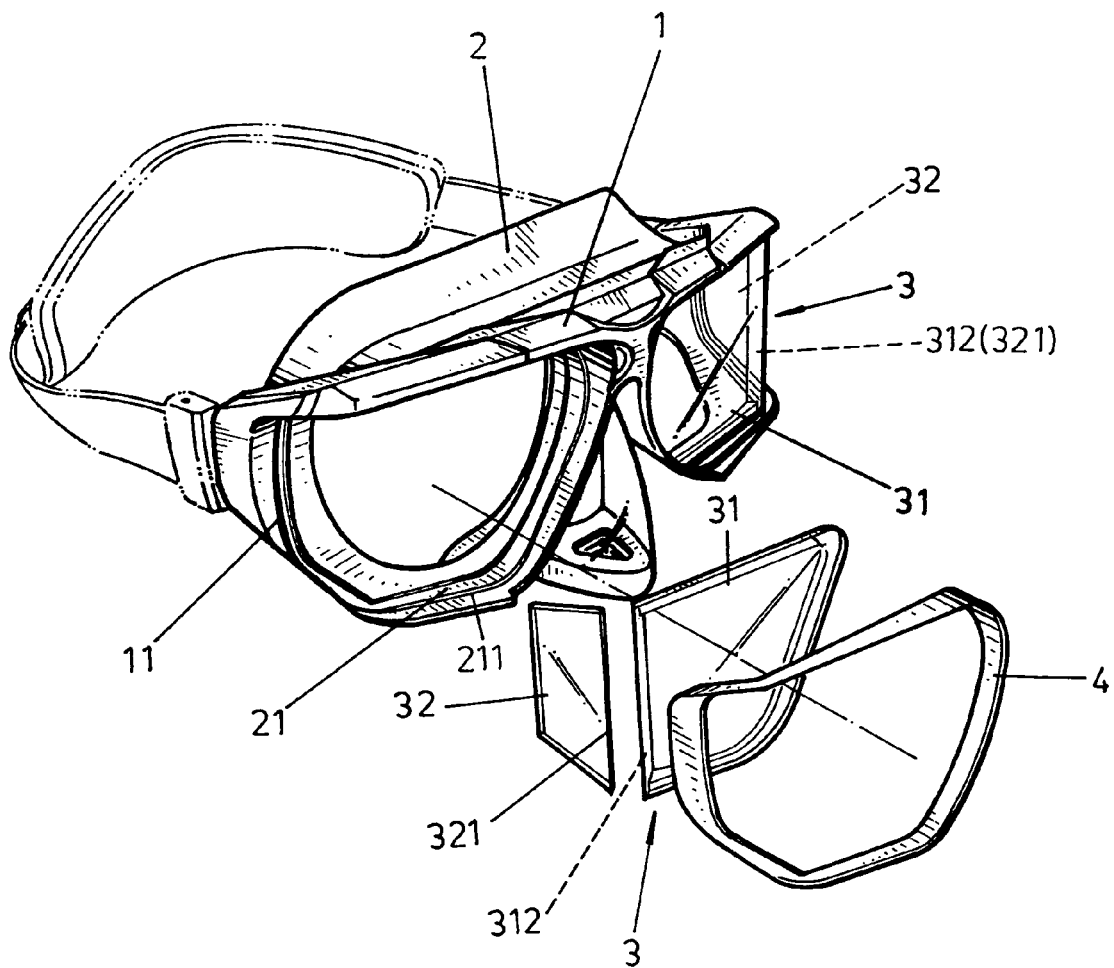
FIG. 2 shows a drawing of part of decomposition of the present invention.

Referring to FIG. 1 and FIG. 2, it shows a two-window diving mask of the present invention. The diving mask comprises primarily a frame 1 made of hard plastic, a mask 2 made of soft silicon, two glass lenses 3, and two frame rims 4 made of hard material. The mask 2 is emplaced inside the frame 1, the two lenses 3 are separately installed in two lens frames 21 formed by the mask 2, the two frame rims 4 are separately latched onto the two lenses 3, and the left and right lenses 3 are separately formed by a front lens 31 and a side lens 32.

Figure 3:
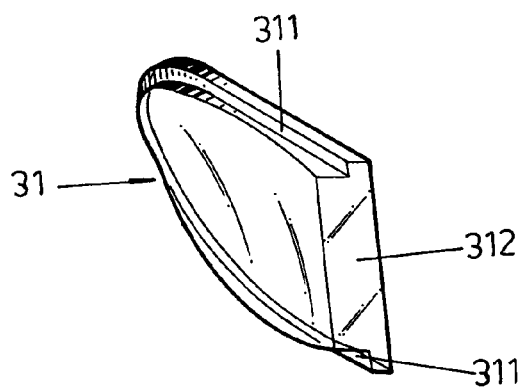
FIG. 3 shows a schematic view of a front lens of the present invention.
Figure 4:
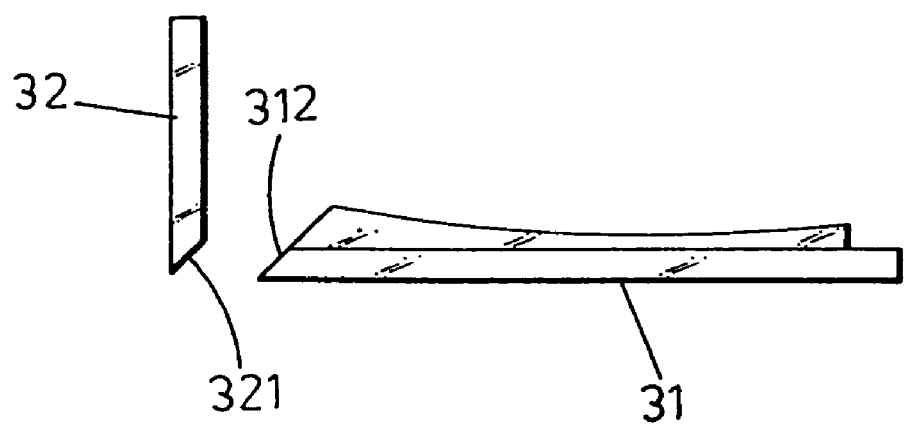
FIG. 4 shows a drawing of decomposition of a front lens and a side lens of the present invention.
Figure 5:
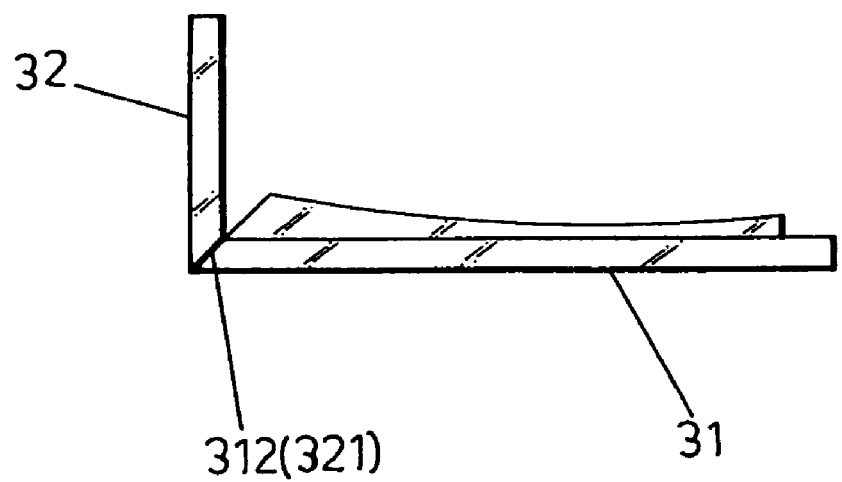
FIG. 5 shows a schematic view of combining a front lens and a side lens of the present invention.

Referring to FIG. 3, the upper, lower, and inner sides of a near-sighted lens 31, which comprises a flat front lens, and a concave back lens, with various thickness per prescription of near-sighting, are contracted and concaved into L-shaped latching pieces 311 for corresponding L-shaped frame grooves 211 formed by the edges of two lens frames 21 of the silicon mask 2. By latching the latching pieces 311 into the frame grooves 211 (as shown in FIG. 2), the front lens 31 can be latched inside the lens frames 21. An assembling section 312 formed by cutting the other side of the front lens 31 and an assembling section 321 formed by cutting one side of the side lens 32 are combined by coating or patching on one or two sides with a layer of elastic and thick binding medium, or by glue (as shown in FIG. 4 and FIG. 5), thereby reducing the effect of assembling interface on the vision of a diver.

Moreover, a latching slot 11 made integrally or formed by assembling, is located at a side of the lens frames 21 for positioning the rear side of the side lens 32. In addition, the front lens 31 is connected with the side lens 32, via the assembling sections 312 and 321, and when the frame rims 4 are covered on the front and side lenses 31 and 32, the front lens 31 will be tightly pushed against the side lens 32 inwardly and outwardly, to press into a water-tight structure, and form a two-window wide-vision diving mirror. As there is no frame edge interfering with the vision between the front and side lenses 31 and 32, the vision will be very wide.

Accordingly, the present invention improves a near-sighted lens at the front side of a conventional wide-vision diving mirror, with a design of a front and a side near-sighted lens with assembling sections. As there is no frame edge interfering with the vision in combining the front and side lenses into a wide-vision diving mirror, the wide vision of the mirror will not be affected.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A near-sighted lens of a wide-vision diving mirror comprising a two-window wide-vision front lens, each window lens having
   a flat front lens surface,
   a concave rear lens surface adapted for near-sighted vision correction,
   an upper side, a lower side, and an inner sides, each formed to have L-shaped latching portions,
   an outer side formed into an assembling section, and
   a side lens with an assembling section adapted to mate with said assembling section of said outer side thereby forming a wide-vision near-sighted front lens for a diving mirror wherein said L-shaped latching portions are adapted to engage latching slots formed by the edges of lens frames of a diving mask.

2. The near-sighted lens of a wide-vision diving mirror according to claim 1, wherein a layer of binding medium is coated on the assembling sections of the front and side lenses.

3. The near-sighted lens of a wide-vision diving mirror according to claim 1, wherein the assembling sections of the front and side lenses are glued together.

* * * * *